(No Model.) 2 Sheets—Sheet 1.
E. G. LATTA.
VELOCIPEDE.
No. 322,733. Patented July 21, 1885.
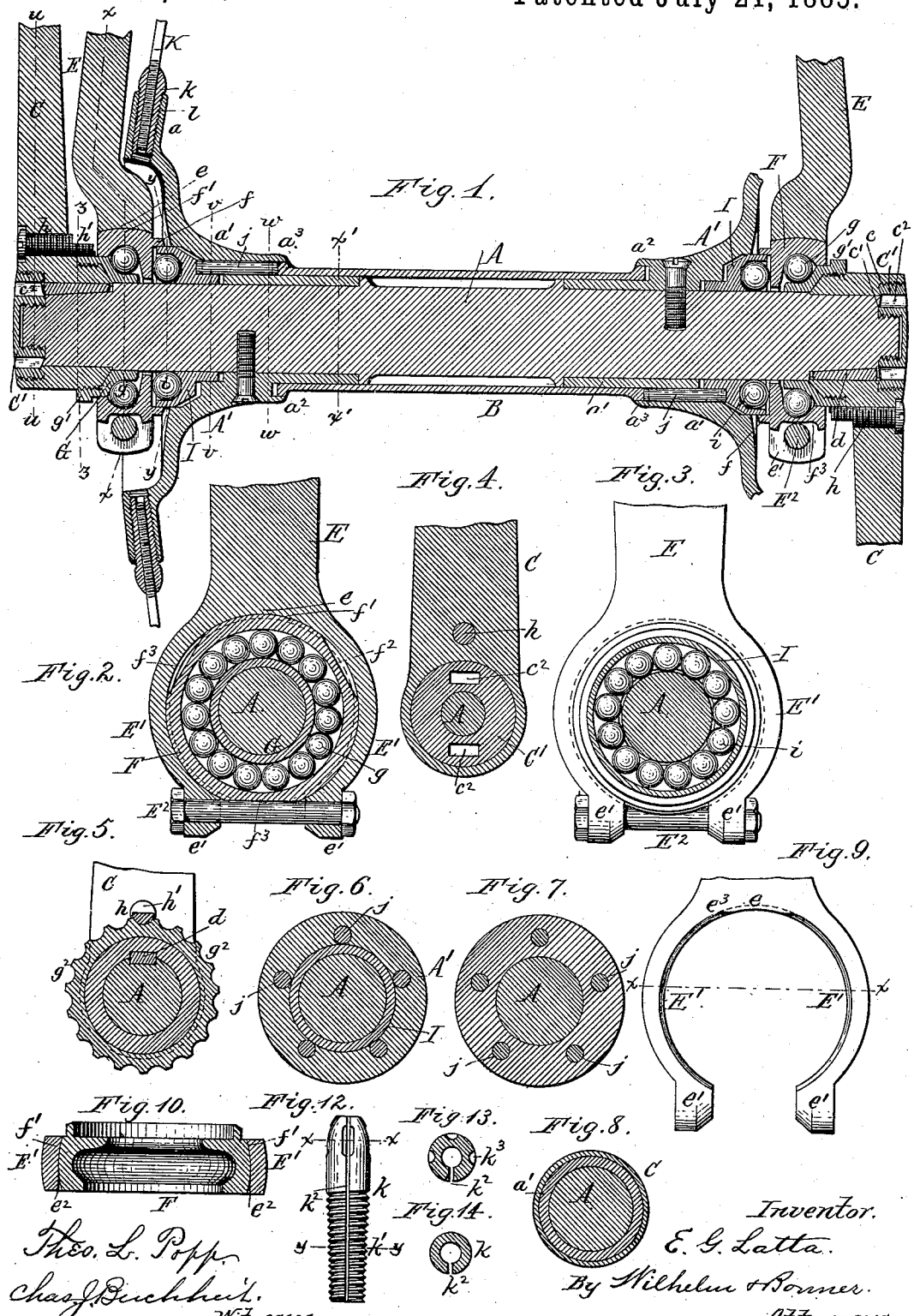

(No Model.) 2 Sheets—Sheet 2.

E. G. LATTA.
VELOCIPEDE.

No. 322,733. Patented July 21, 1885.

Witnesses:
Theo. L. Popp
Chas. J. Buchheit

E. G. Latta Inventor.
By Wilhelm & Bonner
Attorneys.

UNITED STATES PATENT OFFICE.

EMMIT G. LATTA, OF FRIENDSHIP, NEW YORK, ASSIGNOR TO THE POPE MANUFACTURING COMPANY, OF HARTFORD, CONNECTICUT.

VELOCIPEDE.

SPECIFICATION forming part of Letters Patent No. 322,733, dated July 21, 1885.

Application filed August 22, 1884. (No model.)

*To all whom it may concern:*

Be it known that I, EMMIT G. LATTA, of Friendship, in the county of Allegany and State of New York, have invented new and useful Improvements in Velocipedes, of which the following is a specification.

This invention relates to certain improvements in the driving-wheels of velocipedes or bicycles, and has for its object to improve the construction of the central part of the wheel, whereby the axle, cranks, bearings, and spokes are more secure, compact, and reliable, and whereby the various parts can be readily taken apart and put together, and whereby the ball-bearings on the opposite sides of the wheel can be adjusted simultaneously and alike or independent of each other; also, to construct the bearings, boxes, and fork or frame, whereby the bearings can be readily adjusted for wear, and whereby the bearings can be readily removed without removing the fork, and to provide a universal coupling between the bearings and the fork, whereby the machine will run free at all times; also, to construct the fork so that it can be attached or removed without bending or springing it over the axle.

My invention consists, to these ends, of the improvements which will be hereinafter fully described, and pointed out in the claims.

Figure 15:
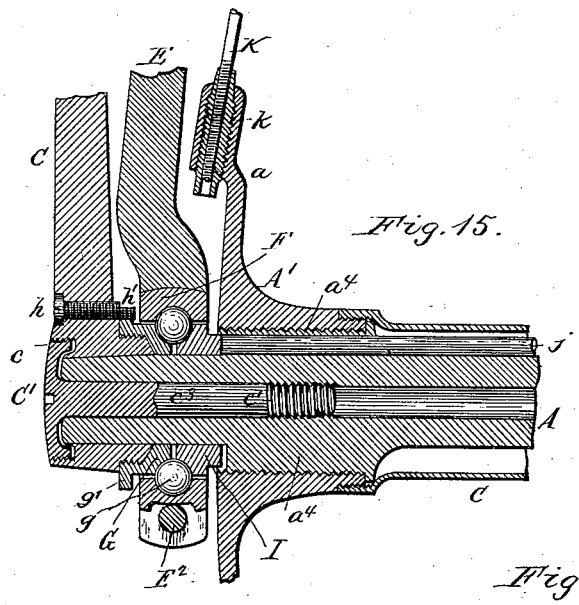
Figure 16:
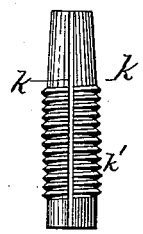
Figure 17:
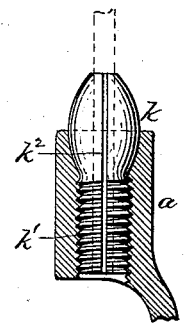
Figure 18:
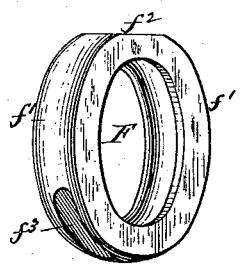
Figure 11:
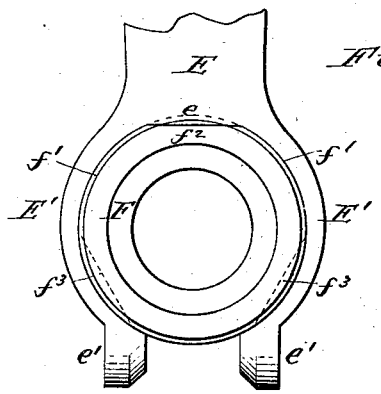

In the accompanying drawings, consisting of two sheets, Figure 1 is a transverse sectional elevation of the central portion of the driving-wheel of a bicycle provided with my improvements. Figs. 2 and 3 are vertical cross-sections in lines $x\ x$ and $y\ y$, Fig. 1, respectively. Figs. 4 and 5 are cross-sections in lines $u\ u$ and $z\ z$, Fig. 1, respectively. Figs. 6, 7, and 8 are cross-sections in lines $v\ v$, $w\ w$, and $x'\ x'$, Fig. 1, respectively. Fig. 9 is a side elevation of the frame with the bearing-box removed. Fig. 10 is a horizontal section in line $x\ x$, Fig. 9, with the bearing-box in position. Fig. 11 is a side elevation of the frame and bearing-box. Fig. 12 is an elevation of one of the nipples for securing the ends of the spokes to the hub on an enlarged scale. Figs. 13 and 14 are horizontal sections of the same in lines $x\ x$ and $y\ y$, Fig. 11, respectively. Fig. 15 is a sectional elevation of a modified construction of my improvements. Figs. 16 and 17 are elevations of modified forms of the nipple for securing the spoke to the hub of the wheel on an enlarged scale. Fig. 18 is a perspective view of the bearing-box.

Like letters of reference refer to like parts in the several figures.

A represents the axle, and A' A' the hubs of the wheel, which are secured to the axle A near both ends in any suitable manner, so as to turn therewith. The hubs A' are provided with the usual disk or rim, $a$, to which the spokes are attached, and with a flange or collar, $a'$, which surrounds the axle A.

B represents a sleeve, which surrounds the center portion of the axle A between the hubs and incloses the inner ends of the collars $a'$.

$a^2$ are annular recesses formed on the hub-flanges $a'$, in which extend the ends of the sleeve B. The sleeve B is free to turn on the axle, and has also a short longitudinal movement on the axle, so that its ends will slide in the recesses $a^2$ of the hub-flanges. The outer rim, $a^3$, of the recesses project over the ends of the sleeve and prevent any dust or water from getting into the recesses $a^2$.

C represents the cranks, which are secured to the opposite ends of the axle A by means of differential screw-nuts C'. The nut C' is provided with an external screw-thread, $c$, which engages in a threaded recess or depression formed in the outer face of the crank and with an internal screw-thread, $c'$, which engages with a screw-thread formed on the end of the axle.

$d$ represents a key inserted between the crank and the axle, the adjacent faces of which are flattened or grooved to receive the key $d$. The inner edge of the screw-nut C' bears against the key $d$, and retains the latter in its place. The screw-nut C' is provided with two or more openings, $c^2$, whereby the nut can be readily turned by inserting a suitable tool in the openings $c^2$. By giving the screw-nut C' a backward turn, so that one of the openings $c^2$ will be in line with the groove or keyway in the axle and crank, the key can be readily inserted through the opening $c^2$ and driven into its seat after the crank has been secured to the axle.

By tightening the nut C' the key $d$ is forced to its seat and the inner edge of the nut covers the end of the key and prevents the key from working out. The screw-threads $c$ $c'$ on the nut C' are of different pitch, the external thread, $c$, being, preferably, of less pitch than the internal thread, $c'$, whereby the crank can be forced on or off by simply turning the nut C'. The inner annular face or edge of the nut C' is preferably grooved or inclined to fit over correspondingly grooved or beveled edges on the axle and crank boss, whereby a larger bearing-surface is formed between these parts. The outer face of the nut C' conceals the end of the axle from view, and when polished or plated forms a neat finish to the end of the axle. When a hollow axle is used, as shown in Fig. 15, the screw-nut C' is preferably provided with a threaded stem, $c^3$, which extends into the bore of the axle a sufficient distance to strenghten the axle outside of the hub.

E represents the end of the fork or frame which straddles the wheel. The lower ends of the fork-arms E terminate in semicircular jaws or arms E', which inclose the bearing-box F.

G represents the cone-bearings seated in the box F, and $g$ represents a row of balls interposed between the cone-bearings G and the box F. The bearing G is made adjustable on the axle by means of an internal screw-thread formed on the annular rim or flange $g'$, which engages with a screw-thread formed on the crank-boss. The outer edge of the rim $g'$ is provided with a series of semicircular grooves or notches, $g^2$, and the bearing is held in place by means of a screw-bolt, $h$, which is inserted through an opening formed in the crank-arm, so that its inner end will engage in one of the grooves $g^2$. The inner end of the screw $h$ is flattened or cut away on one side, as shown at $h'$, so that by giving the screw $h$ a half-turn its inner flat side will be free from the rim or flange of the bearing and permit the latter to be adjusted. When the bearing has been properly adjusted, the bolt $h$ is turned back so that its inner semicircular side will engage in one of the grooves $g^2$, whereby it is firmly held in its proper position.

I represents a collar, which surrounds the axle, and arranged in a recess formed in the outer side of the hub A', and $i$ represents a row of balls, which are confined between the collar I and the bearing-box F. The bearing-box F is provided with a laterally-projecting flange or rim, $f$, which engages over the outer edge of the collar I and prevents any dust or dirt from getting in between the box and the collar I.

$j$ represents pins or bolts seated in openings in the hubs A' and arranged parallel with the axle. The pins $j$ are free to slide in the openings in the hub, and are arranged in line with the sleeve, with their inner ends bearing against the ends of the sleeve and their outer ends against the collar I. The sleeve B with the pins $j$ form a connection between the bearings on the opposite sides of the wheel, so that by adjusting the cone-bearings G on one or the other side of the wheel, the adjustment is at the same time transmitted to the opposite bearings and the adjustment of both bearings equalized and made simultaneously. By adjusting the cone-bearings outside of the hub the bearings can be adjusted from either side of the hub, and in the event of the sleeve B becoming inoperative by reason of rust or accident, the bearings are enabled to be adjusted separately and independent of the sleeve.

The sleeve B may be dispensed with and the pins $j$ be made long enough to extend to opposite sides of the hub; or the sleeve B may be secured at its ends to the hub, and the pins $j$ extend through openings formed in an enlargement, $a^4$, of the axle, as shown in Fig. 15.

The outer row of balls, $g$, receives the greatest part of the weight and most of the friction and wear, and the smooth solid surface of the cone-bearings G permit the balls to run much easier and with less wear to the bearings G than when the bearing is composed of two parts.

The inner row of the balls $i$ serves to retain the bearing-box F in position over the balls $g$ and bearing G by the pressure upon the collar I through the sleeve and pins.

When it is not desired to adjust both bearings at once and the sleeve B and pins $j$ are dispensed with, the inner row of balls, $i$, may be arranged in a groove or recess formed in the hub, and the collar I be omitted. The adjusting-cone F may also be arranged on the inside of the hub, and the inner row of balls arranged so as to receive the strain by forming a groove to receive the balls on the inner face of the crank-boss.

The bearing-box F is constructed with a spherical outer surface, $f'$, which is provided with a flattened or cut-away portion, $f^2$, and two grooved portions, $f^3$ $f^3$, the grooves $f^3$ being arranged in tangential lines with the spherical surface, $f'$, as shown in Figs. 2 and 11.

The lower portion, $e$, of the fork or frame E is concaved to fit the spherical outer surface, $f'$, of the bearing-box F, and the semicircular jaws or arms E' of the fork are made to closely fit the outer surface of the box F and terminate at their lower ends in lugs $e'$. The space between the lugs $e'$ is of sufficient width to allow the fork or frame to be inserted over the wheel and the jaws E' over the axle without bending or springing the jaws E'. The lugs $e'$ $e'$ are connected by a horizontal bolt, E². The inner faces of the semicircular jaws E' are curved part of their width on one side to snugly fit the spherical surface of the bearing-box, and the opposite side of the inner faces of the jaws E' are straight or cut away, as shown at $e^2$ in Fig. 10, to permit the bearing-box to be inserted between the jaws E'.

The bearing-box F is seated in the fork or frame between the jaws E' by arranging the bearing so that its flat portion $f^2$ will coincide with the lower portion, $e$, of the fork, the edges of the lower portion, e, being cut away on one side, as shown at $e^3$, Figs. 9 and 11, to correspond with the flat portion $f^2$. When the parts are in this position, the box can be readily inserted between the jaws E' E', and when so inserted the inner curved side of the faces of the jaws E' will retain the box in line with the jaws and prevent it from being pushed past the jaws. By now giving the box a slight turn in its seat the parts will assume the position shown in Fig. 2. A portion of the spherical surface $f'$ of the box will be under the curved surface $e$ of the fork, and one of the grooves $f^3$ will be at the extreme lower end of the box between the lugs $e'\ e'$ of the jaws. The bolt $E^2$ is now inserted through the lugs, with its upper surface resting in the groove $f^3$, and the box F is firmly secured in place.

By this construction of the fork and bearing-box the bearing-box can be readily removed without removing the fork or frame, and by providing the outer surface of the bearing with two grooves, $f^3$, the bearing can be adjusted in case of wear by bringing the opposite groove $f^3$ in line with the bolt $E^2$. The spherical bearing-surface between the bearing and the fork form a universal joint between these parts, so that the fork or frame can adjust itself freely on the bearing, and all binding between these parts are prevented.

By constructing the lower ends of the jaws E' so as to fit close around the bearing the bolt $E^2$ is enabled to be brought nearer to the bearing, and the parts are more compact, and a neater and stronger build is obtained than if the lower ends were made straight.

The grooves $f^3$ are preferably made wider than the diameter of the bolt, to enable the box F to swing or twist in the fork-jaws, and the bolt $E^2$, projecting into the grooves $f^3$, prevents the box from revolving and assists in holding it in its seat. The grooves $f^3$, however, may be omitted and the box held from turning in the jaws by tightening the jaws around the box by the bolt $E^2$.

K represents the spokes of the wheel, which are secured to the rim or disk of the hub by means of a screw-threaded nipple, $k$. The ends of the spokes are provided with screw-threads, which engage with internal screw-threads formed in the bore of the nipples. The outer surface of the nipples $k$ is tapered and provided with external screw-threads, $k'$, which engage with correspondingly-tapered screw-threads formed in the openings $l$ in the hub-flanges. The nipples $k$ are provided with a slotted opening, $k^2$, extending preferably the entire length of the nipple and through one side of the nipple, so that when the nipple is forced in the threaded opening in the hub-flanges it will bind tightly around the spoke and firmly hold the same in position. The outer surface of the nipple is provided with grooves or notches $k^3$, whereby the nipples can be conveniently turned by means of a suitable tool engaging with the grooves $k^3$.

The threaded portion of the nipple may be made straight and the outer portion tapering, as shown in Fig. 17; or the nipple may be fastened from the inside of the hub, as shown in Fig. 15.

By constructing the nipple with a tapered outer surface, as shown in Fig. 1, the end of the spoke is clamped tightly the entire length of the nipple, and the threaded portion of the spoke is relieved to a great extent from strain and permits the thread on the end of the spoke to be cut very light without danger of stripping the thread.

The nipples are first inserted in the openings $l$, and screwed in as far as they will go without closing the slot $k^2$. The spokes K are then inserted in the bore of the nipples, and when properly adjusted the nipples are tightened and the spokes firmly locked in the nipples. A similar nipple, $k$, may be employed for securing the outer end of the spoke to the rim of the wheel.

I do not wish to claim in this application the construction of the bearing-box and the devices whereby it is attached to the fork, which are described and claimed in my pending application No. 129,763, filed April 29, 1884.

I claim as my invention—

1. The combination, with the axle and hub, of ball-bearings arranged on the axle on opposite sides of the hub, and each composed of an inner movable cone and an outer cone provided with an adjusting device and a sliding connection extending through the hub between the inner movable cones, whereby the adjustment of one outer cone is transmitted to the other ball-bearing, substantially as set forth.

2. The combination, with the axle and hub of the wheel, of ball-bearings arranged on the axle on opposite sides of the hub, and each provided with an outer adjustable cone, G, and sliding pins $j$, and a sliding sleeve, B, extending through the hub between the bearings, whereby the adjustment is transmitted from one bearing to the other, substantially as set forth.

3. The combination, with an axle, of a ball-bearing and bearing-box F, provided with a row of balls, $g$, interposed between the bearing and box and adapted to receive the strain, and a row of balls, $i$, arranged in a suitable bearing on one side of the bearing-box F, and adapted to retain the bearing-box in position, substantially as set forth.

4. The combination, with an axle and crank, of a ball-bearing provided with an annular rim, $g'$, and a screw-bolt, $h$, arranged in the crank and adapted to engage in a notch or groove, $g^2$, formed on the rim $g'$, and provided with a flat portion, $h'$, whereby the bolt is released from the notch in the bearing by a partial turn of the bolt, substantially as set forth.

5. The combination, with the fork provided at its lower end with curved jaws E', having concave inner faces and having their lower ends separated by an intervening opening, of an annular bearing-box, F, having an outer spherical surface and capable of being turned in the concave seat of the jaws E', and a fastening bolt whereby the lower ends of the jaws are connected, substantially as set forth.

6. The combination, with the fork provided at its lower end with curved jaws E', having concave inner faces and having their lower ends separated by an intervening opening, of an annular bearing-box, F, having an outer spherical surface, $f'$, and provided with a flat portion, $f^2$, and a groove, $f^3$, formed in its surface, and a fastening-bolt connecting the ends of the jaws E' and entering the groove $f^3$, substantially as set forth.

7. The combination, with the axle and crank, of a screw-nut provided with differential screw-threads adapted to engage respectively with a screw-thread formed in the crank and a screw-thread formed on the end of the axle, whereby the crank is secured to the axle, substantially as set forth.

8. The combination, with the axle and crank, of a screw-nut, C', provided with an external screw-thread, $c$, adapted to engage with a screw-thread formed in the outer face of the crank, and an internal screw-thread, $c'$, adapted to engage with a screw-thread formed on the end of the axle and conceal the latter from view, substantially as set forth.

9. The combination, with the axle and crank, of a screw-nut, C', provided with screw-threads $c\ c'$, adapted to engage respectively with screw-threads formed on the axle and crank, and a key, $d$, arranged between the adjacent faces of the axle and crank and held in place by the inner face of the screw-nut C', substantially as set forth.

10. The combination, with the axle and crank, of a screw-nut, C', provided with screw-threads $c\ c'$, adapted to engage respectively with threads formed on the axle and crank and overlap the adjacent outer edges of the axle and crank, substantially as set forth.

11. The combination, with the axle and crank, of a screw-nut, C', provided with screw-threads $c\ c'$, adapted to engage respectively with threads formed on the axle and crank and overlap the adjacent outer edges of the axle and crank, and provided with one or more openings, $c^2$, for the insertion of the key $d$, substantially as set forth.

12. The combination, with the spoke of a wheel, of a split sleeve or nipple, $k$, provided with an internal screw-thread adapted to engage with a screw-thread on the end of a spoke, and having its outer surface tapered and provided with an external screw-thread and adapted to engage in a threaded opening in the wheel, whereby the spoke is firmly secured thereto, substantially as set forth.

13. The combination, with the hub A', provided with a threaded opening, $l$, in its rim, and the spoke K, of a threaded nipple, $k$, provided with a slotted opening, $k^2$, and tapered on its outer surface and adapted to engage in the opening $l$ and clamp the inner end of the spoke, substantially as set forth.

14. The combination, with the hub and spoke of a wheel, of a split sleeve or nipple, $k$, provided with a threaded portion, $k'$, adapted to engage in a threaded opening in the rim of the hub and grooves or notches $k^3$, whereby the nipple can be readily turned, substantially as set forth.

15. The combination, with the hub and spoke of a wheel, of a tapered split sleeve or nipple, $k$, provided with a screw-thread on its inner side adapted to engage with the threaded end of the spoke, and a screw-thread, $k'$, on its outer side adapted to engage in a threaded opening, $l$, in the hub of the wheel, whereby the end of the spoke is firmly secured to the hub, substantially as set forth.

Witness my hand this 14th day of August, 1884.

EMMIT G. LATTA.

Witnesses:
M. W. PATTEN,
J. F. RICE.